United States Patent
Lu et al.

(10) Patent No.: US 10,630,339 B2
(45) Date of Patent: Apr. 21, 2020

(54) REDUCING ADJACENT CHANNEL INTERFERENCE FOR WIRELESS VEHICULAR MESSAGES

(71) Applicant: TOYOTA JIDOSHA KABUSHIKI KAISHA, Toyota-shi, Aichi-ken (JP)

(72) Inventors: Hongsheng Lu, Mountain View, CA (US); Gaurav Bansal, Mountain View, CA (US); John Kenney, Mountain View, CA (US); Takayuki Shimizu, Mountain View, CA (US); Yoshiharu Doi, Tokyo (JP); Onur Altintas, Mountain View, CA (US); Roger Melen, Mountain View, CA (US)

(*) Notice: Subject to any disclaimer, the term of this patent is extended or adjusted under 35 U.S.C. 154(b) by 0 days.

(21) Appl. No.: 16/024,400

(22) Filed: Jun. 29, 2018

(65) Prior Publication Data

US 2020/0008086 A1 Jan. 2, 2020

(51) Int. Cl.
*H04B 1/7107* (2011.01)
*H04W 24/08* (2009.01)
*H04W 72/08* (2009.01)
*H04W 4/80* (2018.01)
*H04W 4/40* (2018.01)

(52) U.S. Cl.
CPC ............ *H04B 1/7107* (2013.01); *H04W 4/40* (2018.02); *H04W 4/80* (2018.02); *H04W 24/08* (2013.01); *H04W 72/082* (2013.01)

(58) Field of Classification Search
CPC .................................................. H04B 1/7107
See application file for complete search history.

(56) References Cited

U.S. PATENT DOCUMENTS

| 6,934,387 B1* | 8/2005 | Kim .................. H04B 3/23 379/406.01 |
| 2013/0210460 A1* | 8/2013 | Subramanian ...... B61L 15/0027 455/456.3 |
| 2017/0264251 A1* | 9/2017 | Cook ...................... H03F 3/245 |

(Continued)

FOREIGN PATENT DOCUMENTS

JP        PO2008-172496        7/2008

*Primary Examiner* — Jason E Mattis
(74) *Attorney, Agent, or Firm* — Burbage Law, P.C.; Jon-Michael Burbage; Elizabeth Ruzich

(57) ABSTRACT

The disclosure describes embodiments for reducing adjacent channel interference for wireless vehicular messages. In some embodiments, a method includes monitoring, by an onboard vehicle computer, a channel of a Vehicle-to-Everything (V2X) radio for a V2X message. The method includes determining waveform data describing a waveform that is measured on the channel by the onboard vehicle computer when monitoring the channel. The method includes determining interference data which describes an adjacent channel interference waveform which is measured on the channel by the onboard vehicle computer when monitoring the channel. The waveform includes the adjacent channel interference waveform. The method includes canceling out the adjacent channel interference waveform described by the interference data from the waveform described by the waveform data to generate digital data describing a version of the V2X message that substantially does not include the adjacent channel interference waveform, thereby reducing the adjacent channel interference for the V2X message.

20 Claims, 8 Drawing Sheets

(56) References Cited

U.S. PATENT DOCUMENTS

2017/0374530 A1* 12/2017 Ramasamy ............ G01C 21/28
2018/0338000 A1* 11/2018 Weisman ................ H04L 67/12
2019/0045508 A1*  2/2019 Cariou .................... H04L 5/001
2019/0306678 A1* 10/2019 Byun .................... H04W 76/23

* cited by examiner

300

| The interference management system monitors each of the seven Dedicated Short-Range Communication (DSRC) channels. For example, the interference management system continuously analyzes each of the DSRC channels at transmission events. In some embodiments, the seven DSRC channels are an element of one or more vehicle-to-everything (V2X) radios. An example of a V2X radio is a DSRC radio. 301 |

↓

| For each transmission event and each DSRC channel, the interference management system determines the waveform which is measurable on that DSRC channel. This may be done by measuring the energy level of the waveform which is present on the particular DSRC channel over a period of time. This measurement is described by waveform data.. 303 |

↓

| For each transmission event and each DSRC channel, the interference management system analyzes the mask data (which is constant and known for each channel) and the waveform data (which is variable and is measured at step 303) to determine interference data which describes an adjacent-channel interference waveform which can be heard on this particular DSRC channel at this particular transmission event. This adjacent-channel interference waveform is described by the interference data. 305 |

↓

| For each transmission event and each DSRC channel, the interference management system cancels out the adjacent-channel interference waveform described by the interference data from the waveform described by the waveform data. This yields the DSRC message which can be heard on this particular channel at this particular interval. 307 |

↓

| Steps 303, 305, and 307 are repeated whenever a DSRC message is transmitted using a particular DSRC channel. 308 |

↓

| In some embodiments, the interference management system can send a DSRC message on one channel (e.g., channel #174) to a first entity while receiving a DSRC message from that same entity on a neighboring channel (e.g., channel #178) since the adjacent-channel interference caused on the other channel (e.g., channel #174) can be cancelled out. In this way the interference management system beneficially enables full-duplex communications for DSRC applications. 309 |

↓

| The interference management system allows DSRC transmitters to continue to transmit a low energy level BSM (referred as a "BSM#1") on a channel #172. The interference management system then cancels out the adjacent-channel interference caused by the BSM#1 on channel #172 on neighboring channels #174, #176, #178, #180, #182 and #184 such that any adjacent-channel interference caused by the BSM#1 is eliminated for the six remaining DSRC channels. 311 |

Figure 3

BSM DATA 195

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 4

BSM DATA 195

Part 1

GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate)
- Brake system status Vehicle Size Data

Part 2

Vehicle Path History
Future Vehicle Path Estimation
Hard Active Braking
Traction Control System active over 100 milliseconds?
Antilock Brake System active over 100 milliseconds?
Light Status
Wiper Status
Vehicle type
A unique identifier of the vehicle (e.g., a VIN number)

Figure 5

PSM DATA 197

Part 1

GPS Data for the DSRC-enabled device (local 3D)
- Latitude for the DSRC-enabled device substantially at the time when the PSM message is transmitted
- Longitude for the DSRC-enabled device substantially at the time when the PSM message is transmitted
- Elevation for the DSRC-enabled device substantially at the time when the PSM message is transmitted
- Positional accuracy for the latitude, longitude and elevation information
- Day and time when the latitude, longitude and elevation information where determined Path History Data for the DSRC-enabled device
- Historical GPS Data including all the information described above for past times

Part 2
- Path prediction for a pedestrian over a specified time frame or distance
- Group size for the pedestrian (e.g., how many pedestrians are traveling together as a group based on head count?)
- Group radius for the pedestrian (e.g., for a group of pedestrians traveling together, how big is the radius of the group as they walk together? Groups that are less densely packed together will have a bigger radius. Groups that are more densely packed together will have a smaller radius. Groups with more people by headcount will tend to have a larger radius. Groups that have less people by headcount will tend to have a smaller radius.)
- Estimate of whether the pedestrian is pushing a stroller
- Estimate of whether the pedestrian has intent to cross a roadway
- Whether the pedestrian is currently crossing a roadway
- Estimate of whether the pedestrian is traveling with an animal and the type of animal with the pedestrian
- Estimate of the non-vehicular means of propulsion of the pedestrian (e.g., bike, scooter, skateboard, etc.)

Figure 6

REDUCING ADJACENT CHANNEL INTERFERENCE FOR WIRELESS VEHICULAR MESSAGES

BACKGROUND

The specification relates to reducing adjacent channel interference for wireless vehicular messages.

Full-duplex communication typically includes a single channel being used to both transmit and receive messages with another entity, with the option to send and receive messages at the same time. Dedicated Short Range Communication (DSRC) is increasingly being included in vehicles because it is a source of sensor data which is required for many Advanced Driver Assistance Systems (herein "ADAS system" if singular or "ADAS systems" if plural) or autonomous driving system to provide their functionality.

SUMMARY

Seven different channels are dedicated to DSRC. However, a multi-radio transceiver may not be able to receive a wireless packet on a channel while it transmits on adjacent channels due to the adjacent channel interference that are caused by the vehicle's own DSRC communications, which may be frequent or nearly constant. For example, the DSRC standard requires that Basic Safety Messages (herein "BSM" if singular or "BSMs" if plural) be transmitted once every 0.1 seconds on a dedicated channel, which creates adjacent channel interference on the neighboring channels due to the near constant transmission of messages on this dedicated channel.

Described herein are embodiments an interference management system that is an element of a connected vehicle. The interference management system beneficially solves the problem of adjacent channel interference for connected vehicle by eliminating (or greatly reducing) adjacent channel interference such that wireless messages (e.g., DSRC messages such as BSMs) can be continually received on one channel while other wireless messages (e.g., other DSRC messages) are clearly transmitted on neighboring channels without the need to increase the energy level of the DSRC messages transmitted on these neighboring channels.

The existing solution to the problem of adjacent channel interference for connected vehicles is to increase the energy level of wireless messages transmitted by connected vehicle such that they can be "heard" by recipients even through the adjacent channel interference. This existing solution is not adequate since in practice it still results in some messages not being heard by the recipient due to intense adjacent channel interference. By comparison, the embodiments of the interference management system described herein do not require any energy level increase for wireless messages and wireless messages are never lost due to adjacent channel interference.

For clarity and convenience, the functionality of the embodiments of the interference management system is described herein with reference to DSRC messages. However, in practice the interference management system is operable to reduce or eliminate adjacent channel interference for any type of Vehicle-to-Everything (V2X) message, and not just DSRC messages. For example, the interference management system is operable to reduce or eliminate adjacent channel interference for any type of wireless communication protocol described below with reference to the network 105 or the communication unit 145.

In some embodiments, the interference management system is operable to allow DSRC transmitters to continue to transmit a low energy level "DSRC message #1" on a channel "N." See, e.g., FIGS. 1B and 1C. The interference management system then cancels out the adjacent channel interference caused by DSRC message #1 on neighboring channels "N+1," "N+2," "N+3," "N−1," "N−2" and "N−3" such that any adjacent channel interference caused by DSRC message #1 is eliminated for the six remaining DSRC channels. There is no other solution that provides this example functionality which is provided by the interference management system according to some embodiments.

In some embodiments, the DSRC message is a Pedestrian Safety Message ("PSM" if singular, "PSMs" if plural) that is received by the connected vehicle.

In some embodiments, DSRC messages such as BSMs and PSMs are transmitted or received by a connected vehicle that includes the interference management system, and this causes adjacent channel interference which inhibits the connected vehicle's ability to simultaneously communicate using two adjacent DSRC channels of a DSRC transmitter (e.g., channels 171 and 172) at the same time in a manner which is sufficiently reliable. In some embodiments, the interference management system includes software installed in an onboard vehicle computer of the connected vehicle that solves the problem of adjacent channel interference which is created by the connected vehicle's own DSRC communications. For example, the interference management system includes code and routines that are operable, when executed by the onboard vehicle computer, to cause the onboard vehicle computer to eliminate or dramatically reduce adjacent channel interference caused by the connected vehicle's own DSRC message transmissions such that a multi-radio DSRC transceiver of the connected vehicle can send and receive DSRC messages across any of the seven DSRC channels at the same time or at different times. For example, the interference management system reduces adjacent channel interference such that a radio of the connected vehicle's multi-radio DSRC transceiver can send a DSRC transmission on one DSRC channel (e.g., channel 172) while simultaneously receiving a DSRC transmission on neighboring channel (e.g., channel 171 or 173). An additional benefit of the interference management system is that it actually enables full-duplex communication by a single DSRC radio using different neighboring channels for transmission and reception. Although particularly advantageous for DSRC messaging applications, the interference management system benefits any wireless communication that is negatively affected by adjacent channel interference.

There is no existing solution that eliminates adjacent channel interference for DSRC channels which is caused by BSMs, PSMs, and other DSRC messages. The embodiments of the interference management system described herein solve this problem by providing software which estimates the adjacent channel interference waveform which would be caused by BSMs and PSMs (as well as other DSRC messages or any other V2X message) for neighboring channels and then cancels out this adjacent channel interference waveform (or greatly reduces it) for the neighboring channels so that messages on these neighboring channels can be clearly heard (i.e., the data included in their payload can be received) without the need for the sender to increase the energy level for these V2X messages. No existing solution provides this functionality.

Vehicles that are equipped with DSRC radios transmit a BSM at a periodic interval (e.g., once every 0.10 seconds or some other time interval which is user-configurable, or configurable by the interference management system whenever the vehicle is parked). BSMs include a payload that consists of BSM data. BSM data is digital data that describes, among other things, one or more of the following: the path history of the vehicle which transmits the BSM; a geographic location of the transmitting vehicle with an accuracy of plus or minus 1.5 meters relative to the actual location of the transmitting vehicle; and a heading or trajectory of the transmitting vehicle. BSM data is described in more detail below with reference to FIGS. 4 and 5.

PSMs include a payload that consists of PSM data. PSM data is described in more detail below with reference to FIG. 6. PSMs are described in more detail in U.S. patent application Ser. No. 15/796,296 filed on Oct. 27, 2017 and entitled "PSM Message-based Device Discovery for a Vehicular Mesh Network," the entirety of which is herein incorporated by reference. PSMs are also described in U.S. patent application Ser. No. 15/640,352 filed on Jun. 6, 2017 and entitled "Optimization of a Motion Profile for a Vehicle," the entirety of which is herein incorporated by reference.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: monitoring, by an onboard vehicle computer, a channel of a V2X radio for a V2X message; determining waveform data describing a waveform that is measured on the channel by the onboard vehicle computer when monitoring the channel; determining interference data which describes an adjacent channel interference waveform which is measured on the channel by the onboard vehicle computer when monitoring the channel, where the waveform includes the adjacent channel interference waveform; and canceling out the adjacent channel interference waveform described by the interference data from the waveform described by the waveform data to generate digital data describing a version of the V2X message that substantially does not include the adjacent channel interference waveform. Other embodiments of this aspect include corresponding computer systems, apparatus, and computer programs recorded on one or more computer storage devices, each configured to perform the actions of the methods.

In some embodiments, canceling out the adjacent channel interference waveform includes reducing or minimizing the adjacent channel interference waveform from the waveform described by the waveform data. In some embodiments, canceling out the adjacent channel interference waveform includes eliminating or substantially eliminating the adjacent channel interference waveform from the waveform described by the waveform data.

Implementations may include one or more of the following features. The method where the V2X message is a DSRC message. The method where the V2X message is not one of the following: a WiFi message; a 3G message; a 4G message; a 5G message; a long-term evolution (LTE) message; a millimeter wave communication message; a Bluetooth message; and a satellite communication. The method where the V2X radio is an element of a connected vehicle. The method where the V2X radio is not an element of a connected vehicle. The method where the V2X radio includes a plurality of channels including the channel and a reserved channel, where the reserved channel is adjacent to the channel and the adjacent channel interference waveform is caused by a wireless message that is transmitted on the reserved channel. For example, a BSM is transmitted on the reserved channel and this transmission causes the adjacent channel interference waveform to be heard or observed on the channel which is adjacent to the reserved channel. In some embodiments, the channel is a one or more of the following: immediately adjacent to the reserved channel; second immediately adjacent to the reserved channel; third immediately adjacent to the reserved channel; and . . . Nth immediately adjacent to the reserved channel (where "N" is a positive whole number greater than three). The method where the reserved channel is reserved for BSMs and the adjacent channel interference waveform describes the BSM that is simultaneously heard (other suitable terms for "heard" include "observed" or "received") on the channel and transmitted on the reserved channel by the V2X radio, and this simultaneous transmission and reception by adjacent channels (whether they be immediately adjacent, second immediately adjacent, etc.) causes the adjacent channel interference waveform to be heard (or "observed" or "received") on the channel. The method where the reserved channel is reserved for PSMs and the adjacent channel interference waveform describes the PSM that is simultaneously heard (or "observed" or "received") on the channel and transmitted on the reserved channel by the V2X radio, and this simultaneous transmission and reception by adjacent channels (whether they be immediately adjacent, second immediately adjacent, etc.) causes the adjacent channel interference waveform to be heard (or "observed" or "received") on the channel. Implementations of the described techniques may include hardware, a method or process, or computer software on a computer-accessible medium.

One general aspect includes a system including: a processor communicatively coupled to a V2X radio and non-transitory memory, where the V2X radio is operable to receive a V2X message on a channel of the V2X radio and the non-transitory memory stores computer code that is operable, when executed by the processor, to cause the processor to: monitor, by the processor, the channel for the V2X message; determine waveform data describing a waveform that is measured on the channel by the processor when monitoring the channel; determine interference data which describes an adjacent channel interference waveform which is measured on the channel by the processor when monitoring the channel, where the waveform includes the adjacent channel interference waveform; and cancel out the adjacent channel interference waveform described by the interference data from the waveform described by the waveform data to generate digital data describing a version of the V2X message that substantially does not include the adjacent channel interference waveform. Other embodiments of this aspect include corresponding computer systems, apparatus, and computer programs recorded on one or more computer storage devices, each configured to perform the actions of the methods.

Implementations may include one or more of the following features. The system where the V2X message is a DSRC message. The system where the V2X message is not one of the following: a WiFi message; a 3G message; a 4G message; a 5G message; an LTE message; a millimeter wave communication message; a Bluetooth message; and a satellite communication. The system where the V2X radio is an element of a connected vehicle. The system where monitoring then channel includes the processor measuring the waveform and the adjacent channel interference waveform. The system where the V2X radio includes a plurality of channels including the channel and a reserved channel, where the reserved channel is adjacent to the channel and the adjacent channel interference waveform is caused by a wireless message that is transmitted on the reserved channel. The system where the reserved channel is reserved for BSMs and the adjacent channel interference waveform describes a BSM that is simultaneously heard (or "observed" or "received") on the channel and transmitted on the reserved channel by the V2X radio. The system where the reserved channel is reserved for PSMs and the adjacent channel interference waveform describes a PSM that is simultaneously heard (or "observed" or "received") on the channel and transmitted on the reserved channel by the V2X radio. The computer program product where the V2X radio includes a plurality of channels including the channel and a reserved channel, where the reserved channel is adjacent to the channel and the adjacent channel interference waveform is caused by a wireless message that is transmitted on the reserved channel. The computer program product where the reserved channel is reserved for BSMs and the adjacent channel interference waveform describes a BSM that is simultaneously heard on the channel and the reserved channel by the V2X radio. The computer program product where the reserved channel is reserved for PSMs and the adjacent channel interference waveform describes a PSM that is simultaneously heard on the channel and the reserved channel by the V2X radio. Implementations of the described techniques may include hardware, a method or process, or computer software on a computer-accessible medium.

One general aspect includes a computer program product including instructions that, when executed by a processor, causes the processor to perform operations including: monitoring, by the processor, a channel of a V2X radio for a V2X message; determining waveform data describing a waveform that is measured on the channel by the processor when monitoring the channel; determining interference data which describes an adjacent channel interference waveform which is measured on the channel by the processor when monitoring the channel, where the waveform includes the adjacent channel interference waveform; and canceling out the adjacent channel interference waveform described by the interference data from the waveform described by the waveform data to generate digital data describing a version of the V2X message that substantially does not include the adjacent channel interference waveform. Other embodiments of this aspect include corresponding computer systems, apparatus, and computer programs recorded on one or more computer storage devices, each configured to perform the actions of the methods.

Implementations may include one or more of the following features. The computer program product where the V2X radio includes a plurality of channels including the channel and a reserved channel, where the reserved channel is adjacent to the channel and the adjacent channel interference waveform is caused by a wireless message that is transmitted on the reserved channel. The computer program product where the reserved channel is reserved for BSMs and the adjacent channel interference waveform describes a BSM that is simultaneously heard (or "observed" or "received") on the channel and transmitted on the reserved channel by the V2X radio. The computer program product where the reserved channel is reserved for PSMs and the adjacent channel interference waveform describes a PSM that is simultaneously heard (or "observed" or "received") on the channel and transmitted on the reserved channel by the V2X radio. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 3 depicts a method for reducing adjacent channel interference for a connected vehicle according to some embodiments.

FIGS. 4 and 5 are block diagrams illustrating an example of BSM data according to some embodiments.

FIG. 6 is a block diagram illustrating an example of PSM data according to some embodiments.

DETAILED DESCRIPTION

Figure 1A:
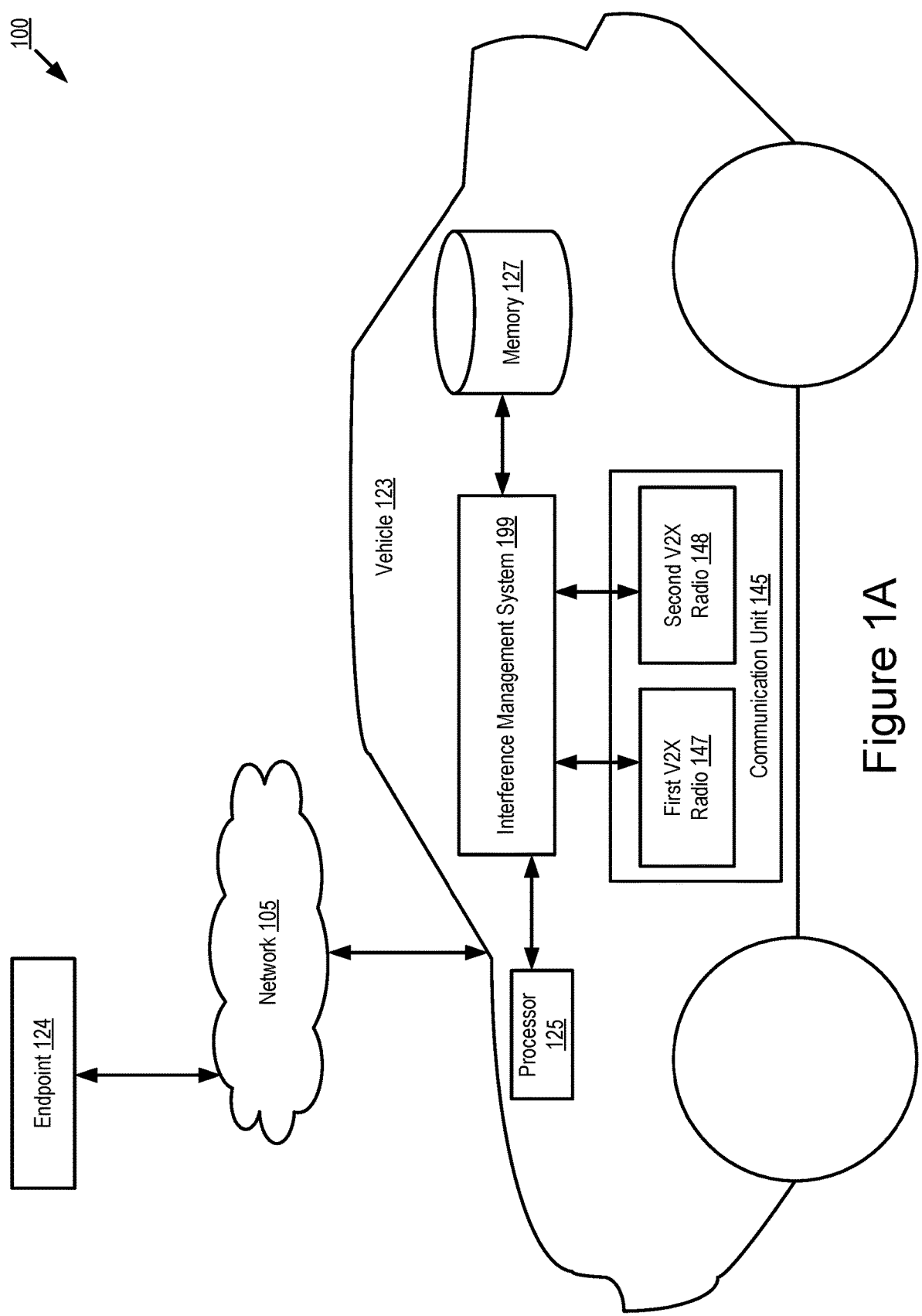
FIG. 1A is a block diagram illustrating an operating environment for an interference management system according to some embodiments.

Embodiments of an interference management system that are operable to reduce or eliminate adjacent channel interference for V2X communications are now described. Examples of V2X communication include one or more of the following: DSRC (including BSMs and PSMs, among other types of DSRC communication); LTE; millimeter wave communication; 3G; 4G; 5G LTE-Vehicle-to-Everything (LTE-V2X); LTE-Vehicle-to-Vehicle (LTE-V2V); LTE-Device-to-Device (LTE-D2D); Voice over LTE (VoLTE); etc.

In some embodiments, the connected vehicle that includes the interference management system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard. The BSM data is described in more detail below with reference to FIGS. 4 and 5 according to some embodiments.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages.

For example, FIGS. 4 and 5 depict examples of a permissible payload for a particular type of DSRC message referred to as a BSM. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

Referring to FIG. 1A, depicted is an operating environment 100 for an interference management system 199 according to some embodiments. As depicted, the operating environment 100 includes the following elements: a vehicle 123; and an endpoint 124. These elements are communicatively coupled to one another by a network 105.

Although one vehicle 123, one endpoint 124, and one network 105 are depicted in FIG. 1A, in practice the operating environment 100 may include one or more vehicles 123, one or more endpoints 124, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, LTE-5G or any other mobile data network or combination of mobile data networks. Further, the network 105 may include one or more IEEE 802.11 wireless networks.

The following are endpoints of the network 105: the vehicles 123; and the endpoint 124.

The vehicle 123 is any type of connected vehicle. For example, the vehicle 123 is one of the following types of vehicles: a car; a truck; a sports utility vehicle; a bus; a semi-truck; a robotic car; a drone or any other roadway-based conveyance. In some embodiments, the vehicle 123 is a DSRC-equipped vehicle.

In some embodiments, the vehicle 123 is an autonomous vehicle or a semi-autonomous vehicle. For example, the vehicle 123 includes a set of Advanced Driver Assistance Systems (a set of "ADAS systems") which provide autonomous features to the vehicle 123 which are sufficient to render the vehicle 123 an autonomous vehicle.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems installed in a vehicle have no vehicle control. The set of ADAS systems may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgement). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the vehicle 123 includes the following elements: a processor 125; a memory 127; a communication unit 145; and an interference management system 199.

In some embodiments, the processor 125 and the memory 127 may be elements of an onboard vehicle computer system (such as computer system 200 described below with reference to FIG. 2). The onboard vehicle computer system may be operable to cause or control the operation of the interference management system 199 of the vehicle 123. The onboard vehicle computer system may be operable to access and execute the data stored on the memory 127 to provide the functionality described herein for the interference management system 199 of the vehicle 123 or its elements (see, e.g., FIG. 2). The onboard vehicle computer system may be operable to execute the interference management system 199 which causes the onboard vehicle computer system to execute one or more steps of one or more of the method 300 described below with reference to FIG. 3.

In some embodiments, the processor 125 and the memory 127 may be elements of an onboard unit. The onboard unit includes an electronic control unit (herein "ECU") or an onboard vehicle computer system that may be operable to cause or control the operation of the interference management system 199. The onboard unit may be operable to access and execute the data stored on the memory 127 to provide the functionality described herein for the interference management system 199 or its elements. The onboard unit may be operable to execute the interference management system 199 which causes the onboard unit to execute one or more steps of one or more of the method 300 described below with reference to FIG. 3. In some embodiments, the computer system 200 depicted in FIG. 2 is an example of an onboard unit.

In some embodiments, the vehicle 123 may include a sensor set. The sensor set may include one or more sensors that are operable to measure the physical environment outside of the vehicle 123. For example, the sensor set may include one or more sensors that record one or more physical characteristics of the physical environment that is proximate to the vehicle 123. The memory 127 may store sensor data that describes the one or more physical characteristics recorded by the sensor set.

In some embodiments, the sensor set of the vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The vehicle 123 may include one or more memories 127.

In some embodiments, the memory 127 stores, as digital data, any data described herein. In some embodiments, the memory 127 stores any data that is necessary for the interference management system 199 to provide its functionality.

The communication unit 145 transmits and receives data to and from a network 105 or to another communication channel. In some embodiments, the communication unit 145 may include a DSRC transceiver, a DSRC receiver and other hardware or software necessary to make the vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes: a first V2X radio 147; and a second V2X radio 148.

The first V2X radio 147 is an electronic device that includes a V2X transmitter and a V2X receiver that is operable to send and receive wireless messages via any V2X protocol. For example, the first V2X radio 147 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The first V2X radio 147 includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving PSMs as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs. In some embodiments, DSRC channel number 176 is reserved for sending and receiving PSMs.

In some embodiments, the first V2X radio 147 includes a non-transitory memory which stores digital data that controls the frequency for broadcasting BSMs. In some embodiments, the non-transitory memory stores a buffered version of the GPS data for the vehicle 123 so that the GPS data for the vehicle 123 is broadcast as an element of the BSMs which are regularly broadcast by the first V2X radio 147.

In some embodiments, the first V2X radio 147 includes any hardware or software which is necessary to make the vehicle 123 compliant with the DSRC standards. In some embodiments, the DSRC-compliant GPS unit 250 depicted in FIG. 2 is an element of the first V2X radio 147.

The second V2X radio 148 is an electronic device that includes a V2X transmitter and a V2X receiver that is operable to send and receive wireless messages via any V2X protocol. The second V2X radio 148 provides functionality that is similar to the first V2X radio 147, and so, that description will not be repeated here.

Figure 1B:
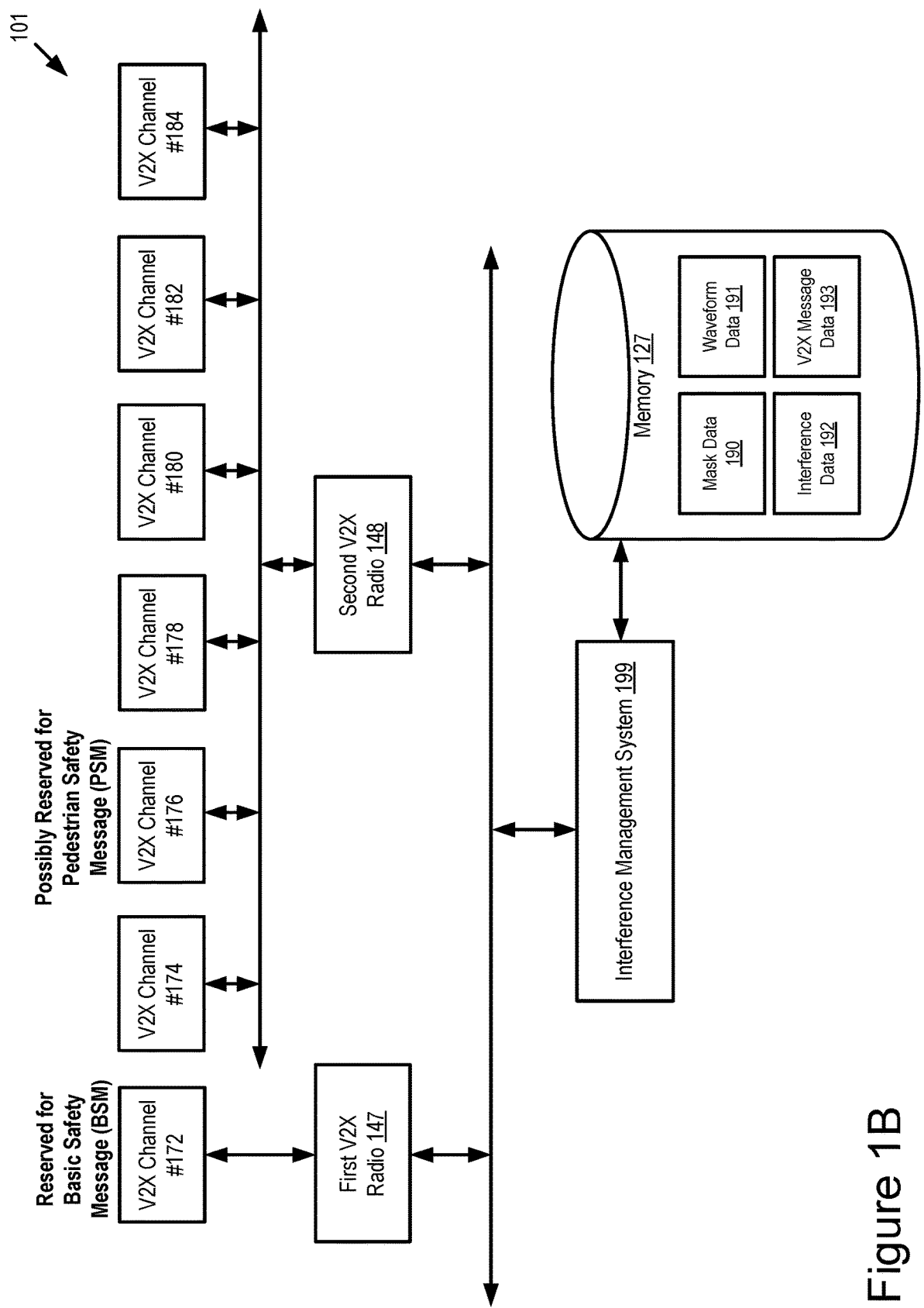
FIG. 1B is a block diagram illustrating a set of V2X radios and an interference management system according to some embodiments.

In some embodiments, the first V2X radio 147 includes a single channel that is dedicated to sending and/or receiving a particular type of wireless message. For example, the first V2X radio 147 includes a single channel that is dedicated to sending and receiving BSMs. See, for example, FIG. 1B in which the first V2X radio 147 includes channel 172 which is dedicated to sending and receiving BSMs. In some embodiments, the first V2X radio 147 includes a single channel that is dedicated to sending and receiving BSMs and the second V2X radio 148 includes a plurality of other channels that are operable to send and receive any V2X messages that are not BSMs. For example, the second V2X radio 148 includes six other channels as depicted in FIG. 1B that are operable to send and receive any V2X messages that are not BSMs.

In another example, the first V2X radio 147 includes a single channel that is dedicated to receiving PSMs and the second V2X radio 148 includes a plurality of other channels that are operable to send and receive any V2X messages that are not PSMs.

In some embodiments, the first V2X radio 147 is a first DSRC radio dedicated to sending and receiving BSMs. The first V2X radio 147 includes a first DSRC radio transceiver. The second V2X radio 148 is a second DSRC radio that sends and receives any DSRC messages which are not BSMs. The second V2X radio 148 includes a second DSRC radio transceiver. See, e.g., FIG. 1C. Accordingly, in some embodiments the vehicle 123 is a DSRC-enabled vehicle that includes two different DSRC radios.

In some embodiments, the interference management system 199 includes software that is operable, when executed by the processor 125, to cause the processor 125 to execute one or more steps of the method 300 described below with reference to FIG. 3. The functionality of the interference management system 199 is described in more detail below according to some embodiments.

In some embodiments, the interference management system 199 is implemented using hardware including a field-programmable gate array ("FPGA") or an application-specific integrated circuit ("ASIC"). In some other embodiments, the interference management system 199 implemented using a combination of hardware and software.

The endpoint 124 is any electronic device that is operable to send and receive V2X communications. For example, the endpoint 124 is an electronic device, or another connected vehicle, including a communication unit similar to the communication unit 145. In some embodiments, the endpoint 124 is a smartphone, tablet computer, personal computer, roadside unit or some other processor-based computing device that includes a communication unit 145. In some embodiments, the endpoint 124 is a DSRC-equipped device that is operable to send and receive DSRC messages.

Full-duplex communication typically includes a single channel being used to both transmit and receive messages with another entity, with the option to send and receive messages at the same time. By comparison, half-duplex communication does not include the option to send and receive messages at the same time.

DSRC is increasingly being included in vehicles because it is a source of sensor data which is required for many ADAS systems or autonomous driving system to provide their functionality. In the United States, seven different channels are dedicated to DSRC, with one of these seven channels generally used for transmission of BSMs. For example, the channel is used about 99% of the time for BSM transmissions, and so, for the purposes of this description, this channel is referred to as "the channel dedicated to BSMs" or "the channel reserved for BSMs." The channel dedicated to BSMs (i.e., channel 172) receives a lot of use because each DSRC-enabled vehicle on the roadway transmits BSMs at regular intervals (e.g., one every 0.10 seconds). Another of these seven channels may be generally used for PSMs in a manner similar to how channel 172 is generally used for BSMs, and so, this channel is referred to as being "dedicated to PSMs" or "reserved for PSMs." For example, it is thought that channel 176 may be generally used for PSMs.

In some embodiments, when the vehicle 123 is operating on a roadway these two channels (i.e., the first for BSMs and the second for PSMs) are in near constant use, almost always sending or receiving BSMs or PSMs. As a result, the remaining five channels dedicated to DSRC messages will be difficult to use due to adjacent channel interference caused by the large number of BSMs and PSMs. In some embodiments, the interference management system 199 solves this problem by eliminating adjacent channel interference such that DSRC messages can be received on one channel while one or more DSRC messages are being transmitted on neighboring channels.

In some embodiments, the vehicle 123 is equipped with two or more different DSRC radios (e.g., the first V2X radio 147 and the second V2X radio 148). Each of the DSRC radios includes a DSRC transmitter and a DSRC receiver. One of the DSRC radios is dedicated solely to receiving BSMs. The other DSRC radio(s) is used to receive any other non-BSM DSRC messages.

In some embodiments, the memory 127 stores mask data. The mask data includes digital data that describes the transmission mask for each of the seven DSRC channels. See, e.g., the mask data 190 depicted in FIGS. 1B and 1C.

In some embodiments, the interference management system 199 includes code and routines that are operable, when executed by the processor 125, to cause the processor 125 to monitor each of the seven DSRC channels. The processor 125 has access to the mask data 190 which is stored in the memory 127. For example, the mask data 190 is stored in a buffer of one or more of the first V2X radio 147 and the second V2X radio 148 so that it is quickly retrievable by the processor 125.

In some embodiments, the interference management system 199 includes code and routines that are operable, when executed by the processor 125, to cause the processor 125 to continuously analyze each of the DSRC channels when a DSRC packet is sent (e.g., every 0.10 seconds).

In some embodiments, the interference management system 199 includes code and routines that are operable, when executed by the processor 125, to cause the processor 125 to determine the adjacent channel interference present on each DSRC channel based on: (1) the waveform of the transmitted DSRC message [e.g., waveform data 191 for a particular DSRC message]; (2) the energy level of the waveform present on the channel that was used for the packet transmissions; and (3) the mask data for each of the channels.

Figure 1C:
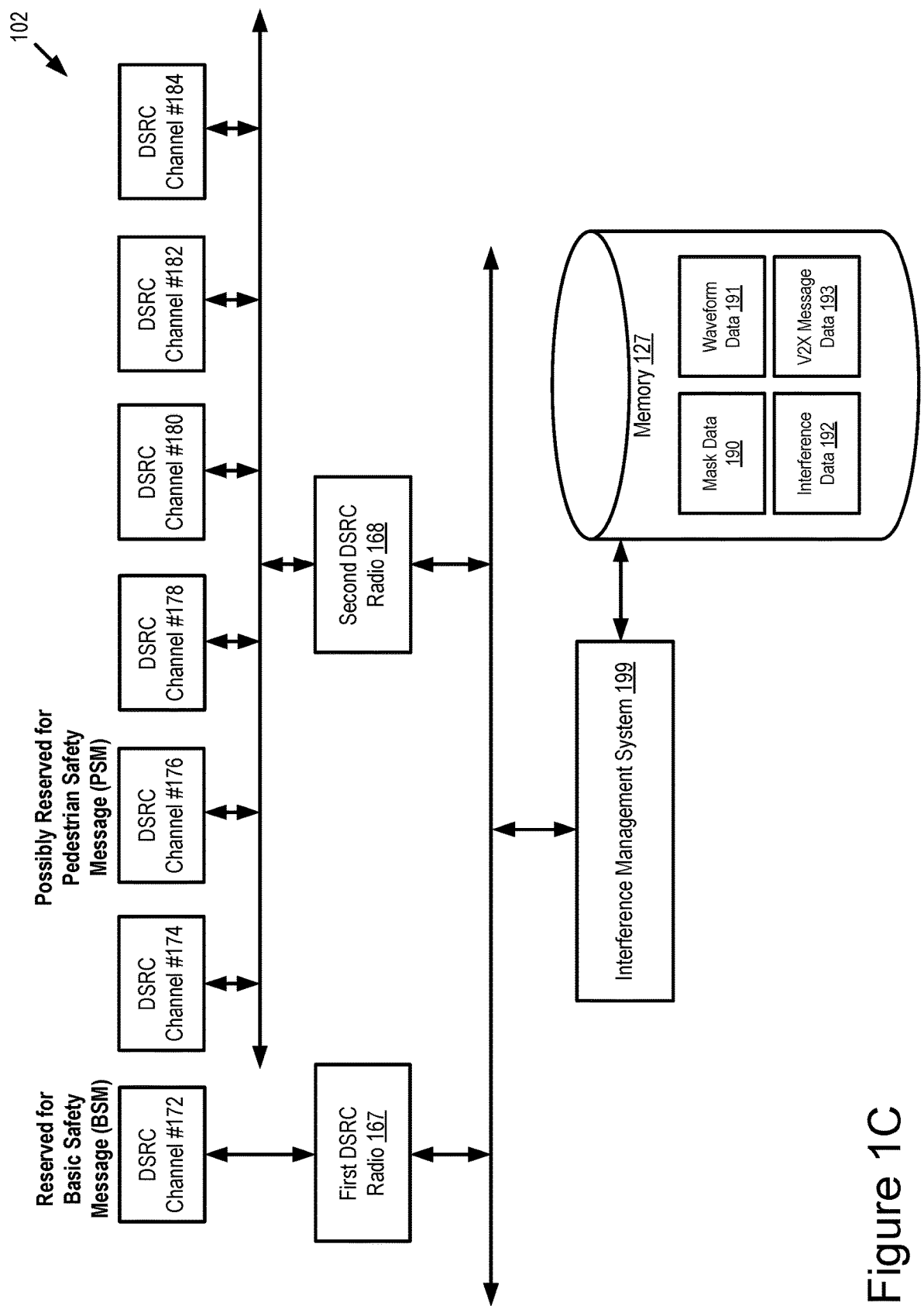
FIG. 1C is a block diagram illustrating a set of DSRC radios and an interference management system according to some embodiments.

FIGS. 1B and 1C depicts examples of waveform data 191. Waveform data 191 is digital data that describes the waveform of a DSRC message. The waveform of a DSRC message is measurable on a particular DSRC channel by the processor 125 at the time it is transmitted or received. For example, the waveform of a DSRC message is measurable on the particular DSRC channel by the processor 125 based on the energy level of the waveform over time or other measurable parameters that describe the waveform.

In some embodiments, the interference management system 199 includes code and routines that are operable, when executed by the processor 125, to cause the processor 125 to measure the waveform data 191 for a particular DSRC channel upon receiving a DSRC message on this particular DSRC channel. The energy level may not need to be measured by the processor 125 because it is described in information that is already included in the DSRC message. For example, the DSRC message includes one or more bits of data that describes the energy level for the DSRC message.

FIGS. 1B and 1C depict examples of interference data 192 according to some embodiments. In some embodiments, at the time when the DSRC message is transmitted, the interference management system 199 analyzes the mask data 190 and the waveform of the transmitted packet (e.g., the waveform data 191 for the transmitted packet) for each adjacent DSRC channel to determine interference data 192 for that DSRC channel at this particular time. The interference data 192 is digital data that describes the portion of the waveform measurable on a particular DSRC channel which is attributable to the adjacent channel interference which is bleeding into that particular DSRC channel from a neighboring channel. For example, the interference management system 199 includes code and routines that are operable, when executed by the processor 125, to cause the processor 125 to take into account the transmission mask (as described by the mask data 190) and the waveform (as described by the waveform data 191) for each DSRC channel so that DSRC messages are heard by the processor 125 when the communication unit 145 transmits DSRC messages using one or more of the seven channels. For example, the code and routines of the interference management system 199 are operable, when executed by the processor 125, to cause the processor 125 to cancel out the transmission mask described by the mask data 190 from the waveform described by the waveform data 191.

A transmission event is a V2X transmission (e.g., a DSRC transmission) on a particular channel of a V2X radio (e.g., a DSRC channel of a DSRC radio or some other V2X channel of a V2X radio).

In some embodiments, waveform data 191 is digital data that describes the measurable aspects of the waveform present on a particular DSRC channel for a particular interval. The waveform described by the waveform data 191 is not a static value but is instead a function that describes a waveform which is present in a particular DSRC channel over a specific period of time (e.g., during a transmission event). This waveform may include the DSRC message which is transmitted on a particular DSRC channel. The interference data 192 is digital data that describes the adjacent channel interference present on a neighboring DSRC channel(s) during a transmission event. Like the waveform data 191, the interference data 192 describes a waveform which is the adjacent channel interference present on a particular DSRC channel during a transmission event. The mask data 190 is digital data that describes the transmission mask for each of the seven DSRC channels.

In some embodiments, the interference management system 199 includes software that is operable, when executed by the processor 125, to cause the processor 125 to monitor each of the DSRC channels available to the first V2X radio 147 and the second V2X radio 148. This software has access to the mask data 190 which is stored in the memory 127.

In some embodiments, the interference management system 199 includes software that is operable, when executed by the processor 125, to cause the processor 125 to continuously analyze each of the DSRC channels at transmission events. For each transmission event and each DSRC channel, the interference management system 199 includes software that is operable, when executed by the processor 125, to cause the processor 125 to determine the adjacent channel interference present on each DSRC channel based on: (1) the waveform of the transmitted DSRC message (2) the energy level of the waveform present on the channel that has the packet transmission; and (3) the mask data 190 for each of the channels. For each transmission event and each DSRC channel, the interference management system 199 includes software that is operable, when executed by the processor 125, to cause the processor 125 to determine the waveform data 191 for each DSRC channel by measuring the energy level of the waveform which is present on this particular DSRC channel and other measurable parameters that describe the waveform. These measurements are described by waveform data 191. The mask data 190 for each channel is known and stored in the memory 127. For example, the mask data 190 for each transmitted DSRC message is known and stored in the memory 127. For each transmission event and each DSRC channel (i.e., for each transmitted DSRC message), the interference management system 199 includes software that is operable, when executed by the processor 125, to cause the processor 125 to analyze the mask data 190 and the waveform data 191 to determine interference data 192 for that DSRC channel at this transmission event. For each transmission event and each DSRC channel (i.e., for each transmitted DSRC message), the interference management system 199 includes software that is operable, when executed by the processor 125, to cause the processor 125 to cancel out the adjacent channel interference waveform described by the interference data 192 from the waveform described by the waveform data 191 to arrive at the V2X message data 193 (see, e.g., FIGS. 1B and 1C) which describes one or more DSRC messages (or some other type of V2X message) which are received on a particular channel. This cancellation process is repeated for each channel and each interval. The end result of this cancellation process is the V2X message data 193. For example, the cancellation process is repeated for each V2X message received on a first channel so that a DSRC message transmitted on a reserved channel does not prevent the V2X message data 193 included in each V2X message from being determined (or received/heard by the V2X radio).

In some embodiments, the V2X message data 193 describes a payload for a V2X message. For example, the V2X message data 193 describes the BSM data 195 for a BSM. In some embodiments, the V2X message data 193 describes the payload for a DSRC message or any other type of V2X message.

Referring now to FIG. 1B, depicted is an is an operating environment 101 that includes a set of V2X radios 147, 148 and the interference management system 199 according to some embodiments.

As depicted in FIG. 1B, V2X channel #172 is the channel is reserved for BSMs. The first V2X radio 147 is dedicated to sending and receiving BSMs using V2X channel #172. The other six V2X channels (#174, #176, #178, #180, #182 and #184) are accessible to the second V2X radio 148. As depicted in this embodiment, channel #176 is reserved for receiving PSMs.

The interference management system 199 can support transmission of a DSRC message on one channel (e.g., channel #174) to a first entity while receiving a DSRC message from that same entity on a neighboring channel (e.g., channel #178) since the adjacent channel interference caused on the other channel (e.g., channel #174 or channel #172) can be cancelled out or reduced by the interference management system 199. There is no other solution that provides this functionality which is provided by the interference management system 199 according to some embodiments.

In some embodiments, the interference management system 199 is operable to allow DSRC transmitters (e.g., the endpoint 124) to continue to transmit a low energy level BSM (referred to in this paragraph as "BSM #1") on a channel #172. The interference management system 199 then cancels out the adjacent channel interference caused by the BSM #1 on channel #172 on neighboring channels #174, #176, #178, #180, #182 and #184 such that any adjacent channel interference caused by the BSM #1 is eliminated for the six remaining V2X channels. There is no other solution that provides this functionality which is provided by the interference management system 199 according to some embodiments.

Referring now to FIG. 1C, depicted is an is an operating environment 102 that includes a set of DSRC radios 167, 168 and the interference management system 199 according to some embodiments.

The first DSRC radio 167 provides the same functionality as the first V2X radio 147 depicted in FIGS. 1A and 1B with the exception that, in FIG. 1C, the first DSRC radio 167 is operable to only send and receive DSRC transmissions whereas the first V2X radio 147 is operable to send and receive any type of V2X message, including DSRC messages. Similarly, the second DSRC radio 168 provides the same functionality as the second V2X radio 148 depicted in FIGS. 1A and 1B with the exception that, in FIG. 1C, the second DSRC radio 168 is operable to only send and receive DSRC transmissions whereas the second V2X radio 148 is operable to send and receive any type of V2X message, including DSRC messages.

As depicted in FIG. 1C, DSRC channel #172 is the channel is reserved for BSMs. The first DSRC radio 167 is dedicated to sending and receiving BSMs using DSRC channel #172. The other six DSRC channels (#174, #176, #178, #180, #182 and #184) are accessible to the second DSRC radio 168. As depicted in this embodiment, channel #176 is reserved for receiving PSMs.

As depicted in FIG. 1C, the interference management system 199 can support transmission of a DSRC message on one channel (e.g., channel #174) to a first entity while receiving a DSRC message from that same entity on a neighboring channel (e.g., channel #178) since the adjacent channel interference caused on the other channel (e.g., channel #174 or channel #172) can be cancelled out or reduced by the interference management system 199. There is no other solution that provides this functionality which is provided by the interference management system 199 according to some embodiments.

In some embodiments, the interference management system 199 as depicted in FIG. 1C is operable to allow DSRC transmitters (e.g., the endpoint 124) to continue to transmit a low energy level BSM (referred to in this paragraph as "BSM #1") on a channel #172. The interference management system 199 then cancels out the adjacent channel interference caused by the BSM #1 on channel #172 on neighboring channels #174, #176, #178, #180, #182 and #184 such that any adjacent channel interference caused by the BSM #1 is eliminated for the six remaining V2X channels. There is no other solution that provides this functionality which is provided by the interference management system 199 according to some embodiments.

Example Computer System

Figure 2:
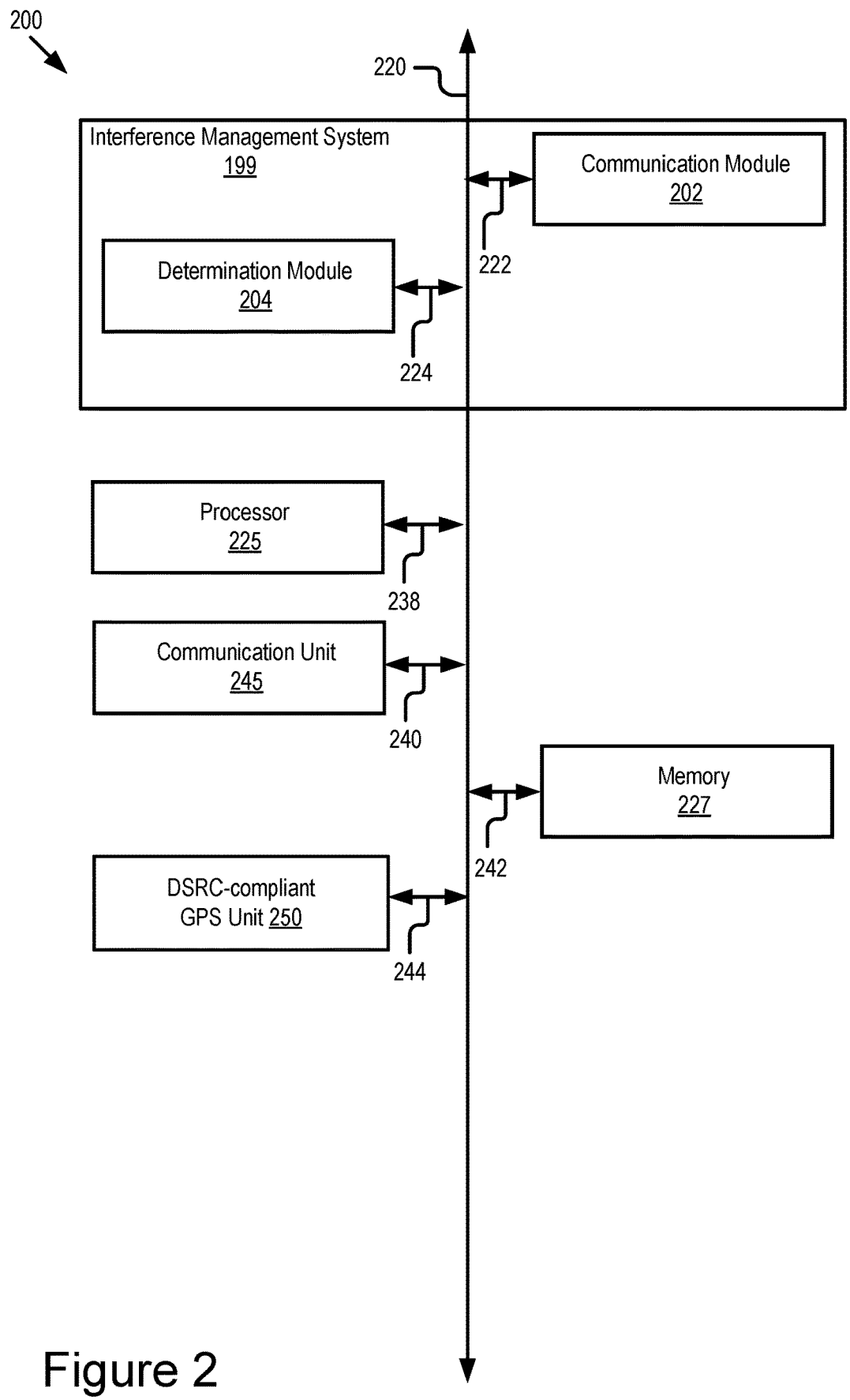
FIG. 2 is a block diagram illustrating an example computer system including the interference management system according to some embodiments.

Referring now to FIG. 2, depicted is a block diagram illustrating an example computer system 200 including the interference management system 199 according to some embodiments. In some embodiments, the computer system 200 may include a special-purpose computer system that is programmed to perform one or more steps of one or more of the method 300 described below with reference to FIG. 3. In some embodiments, the computer system 200 is an onboard vehicle computer of the vehicle 123. In some embodiments, the computer system 200 is an onboard unit of the vehicle 123. In some embodiments, the computer system 200 is an electronic control unit (ECU), head unit or some other processor-based computing device of the vehicle 123.

The computer system 200 includes one or more of the following elements according to some examples: the interference management system 199; a processor 225; a communication unit 245; a memory 227; and a DSRC-compliant GPS unit 250. The components of the computer system 200 are communicatively coupled by a bus 220.

In the illustrated embodiment, the processor 225 is communicatively coupled to the bus 220 via a signal line 238. The communication unit 245 is communicatively coupled to the bus 220 via a signal line 240. The memory 127 is communicatively coupled to the bus 220 via a signal line 242. The DSRC-compliant GPS unit 250 is communicatively coupled to the bus 220 via a signal line 244.

The processor 225 provides similar functionality as the processor 125 described above with reference to FIG. 1A, and so, that description will not be repeated here. The communication unit 245 provides similar functionality as the communication unit 245 described above with reference to FIG. 1A, and so, that description will not be repeated here. The memory 227 provides similar functionality as the memory 127 described above with reference to FIG. 1A, and so, that description will not be repeated here.

The memory 227 may store any of the data described above with reference to FIGS. 1A, 1B, and 1C or below with reference to FIGS. 2-6. The memory 227 may store any data needed for the computer system 200 to provide its functionality.

In some embodiments, the DSRC-compliant GPS unit 250 includes any hardware and software necessary to make the vehicle 123, computer system 200, or the DSRC-compliant GPS unit 250 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 250 is operable to provide GPS data describing the location of the vehicle 123 with lane-level accuracy. For example, the vehicle 123 is traveling in a lane of a roadway. Lane-level accuracy means that the location of the vehicle 123 is described by the GPS data so accurately that the lane of travel of the vehicle 123 within the roadway may be accurately determined based on the GPS data for this vehicle 123 as provided by the DSRC-compliant GPS unit 250. In some embodiments, the GPS data is an element of the BSM data 195 (see, e.g., FIGS. 4 and 5) or the PSM data 197 (see, e.g., FIG. 6).

In some embodiments, the DSRC-compliant GPS unit 250 includes hardware that wirelessly communicates with a GPS satellite to retrieve GPS data that describes the geographic location of the vehicle 123 with a precision that is compliant with the DSRC standard. The DSRC standard requires that GPS data be precise enough to infer if two vehicles (one of which is, for example, the vehicle 123) are located in adjacent lanes of travel. In some embodiments, the DSRC-compliant GPS unit 250 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the interference management system 199 described herein may analyze the GPS data provided by the DSRC-compliant GPS unit 250 and determine what lane the vehicle 123 is traveling in based on the relative positions of two or more different vehicles (one of which is, for example, the vehicle 123) traveling on the roadway at the same time.

By comparison to the DSRC-compliant GPS unit 250, a conventional GPS unit which is not compliant with the DSRC standard is unable to determine the location of a vehicle 123 with lane-level accuracy. For example, a typical roadway lane is approximately 3 meters wide. However, a conventional GPS unit only has an accuracy of plus or minus 10 meters relative to the actual location of the vehicle 123. As a result, such conventional GPS units are not sufficiently accurate to identify a lane of travel for a vehicle 123 based on GPS data alone; instead, systems having only conventional GPS units must utilize sensors such as cameras to identify the lane of travel of the vehicle 123. Identifying a lane of travel of a vehicle is beneficial, for example, because in some embodiments it may enable the interference management system 199 to more accurately identify a location of a vehicle 123 including the computer system 200 and traveling in a roadway having multiple lanes of travel.

In the illustrated embodiment shown in FIG. 2, the interference management system 199 includes: a communication module 202; and a determination module 204.

The communication module 202 can be software including routines for handling communications between the interference management system 199 and other components of the operating environments 100, 101, 102 of FIGS. 1A, 1B, and 1C, respectively.

In some embodiments, the communication module 202 can be a set of instructions executable by the processor 225 to provide the functionality described below for handling communications between the interference management system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, some or all of the digital data stored on the memory 127. The communication module 202 may send or receive any of the digital data or messages described above with reference to FIGS. 1A, 1B, 1C, or below with reference to FIGS. 2-6, via the communication unit 245.

In some embodiments, the communication module 202 receives data from components of the interference management system 199 and stores the data in the memory 227 (or a buffer or cache of the memory 227, or a standalone buffer or cache which is not depicted in FIG. 2). For example, the communication module 202 receives the BSM data 195 from the communication unit 245 and stores the BSM data 195 in the memory 227.

In some embodiments, the communication module 202 may handle communications between components of the interference management system 199. For example, the communication module 202 transmits the mask data 190 from the memory 227 to the determination module 204.

In some embodiments, the determination module 204 can be a set of instructions executable by the processor 225 which are operable, when executed by the processor 225, to cause the processor 225 to execute one or more steps of the method 300 described below with reference to FIG. 3. In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

Example Processes

FIG. 3 depicts a method 300 for reducing adjacent channel interference for a connected vehicle according to some embodiments. The steps of the method 300 are executable in any order, and not necessarily the order depicted in FIG. 3.

At step 301, the interference management system monitors each of the seven DSRC channels. For example, the interference management system continuously analyzes each of the DSRC channels at transmission events. In some embodiments, the seven DSRC channels are an element of one or more V2X radios. An example of a V2X radio is a DSRC radio.

At step 303, for each transmission event and each DSRC channel, the interference management system determines the waveform which is measurable on that DSRC channel. This may be done by measuring the energy level of the waveform which is present on the particular DSRC channel over a period of time. This measurement is described by waveform data.

At step 305, for each transmission event and each DSRC channel, the interference management system analyzes the mask data (which is constant and known for each channel) and the waveform data (which is variable and is measured at step 303) to determine interference data which describes an adjacent channel interference waveform which can be heard on this particular DSRC channel at this particular transmission event. This adjacent channel interference waveform is described by the interference data.

At step 307, for each transmission event and each DSRC channel, the interference management system cancels out the adjacent channel interference waveform described by the interference data from the waveform described by the waveform data. This yields the DSRC message which can be heard on this particular channel at this particular interval.

In some embodiments, canceling out the adjacent channel interference waveform includes reducing or minimizing the adjacent channel interference waveform from the waveform described by the waveform data. In some embodiments, canceling out the adjacent channel interference waveform includes eliminating or substantially eliminating the adjacent channel interference waveform from the waveform described by the waveform data.

At step 308, one or more of the following steps of this method 300 are repeated whenever a DSRC message is transmitted using a particular DSRC channel: step 303; step 305; and step 307.

At step 309, the interference management system can send a DSRC message on one channel (e.g., channel #174) to a first entity while receiving a DSRC message from that same entity on a neighboring channel (e.g., channel #178) since the adjacent channel interference caused on the other channel (e.g., channel #174) can be cancelled out. In this way the interference management system beneficially enables full-duplex communications for DSRC applications.

At step 311, the interference management system allows DSRC transmitters to continue to transmit a low energy level BSM (referred to in this paragraph as a "BSM #1") on a channel #172. The interference management system then cancels out the adjacent channel interference caused by the BSM #1 on channel #172 on neighboring channels #174, #176, #178, #180, #182 and #184 such that any adjacent channel interference caused by the BSM #1 is eliminated for the six remaining DSRC channels.

Referring now to FIG. 4, depicted is a block diagram illustrating an example of the BSM data 195 according to some embodiments.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints.

Referring now to FIG. 5, depicted is a block diagram illustrating an example of BSM data 195 according to some embodiments.

A BSM may include two parts. These two parts may include different BSM data 195 as shown in FIG. 5.

Part 1 of the BSM data 195 may describe one or more of the following: the GPS data of the vehicle; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle.

Referring now to FIG. 6, depicted is a block diagram illustrating an example of PSM data 197 according to some embodiments. In some embodiments, an instance of PSM data 197 describes the relationship between a particular pedestrian (or a group of pedestrians) in relation to roadway infrastructure for a particular geographic location. The roadway infrastructure may be an element of a roadway environment which includes a vehicle 123 which receives the PSM message that includes the PSM data 197.

As depicted, the PSM data 197 includes two parts: Part 1; and Part 2.

Part 1 of the PSM data 197 includes digital data that describes: the GPS data for the DSRC-enabled device; and the path history data for the DSRC-enabled device.

The elements of the GPS data are depicted in FIG. 1B according to some embodiments. In some embodiments, the GPS data is generated by a DSRC-compliant GPS unit such that the GPS data included in Part 1 is accurate to within plus or minus 1.5 meters 68% of the time when the DSRC-compliant GPS unit of the DSRC-enabled device is under an open sky.

In some embodiments, the path history data describes historical GPS data for a successive number of past times such that the path history data describes a historical path of the DSRC-enabled device.

Part 2 of the PSM data 197 includes digital data that describes: a path prediction of the DSRC-enabled device over a specified time and frame (e.g., based on a trajectory indicated by the path history data of Part 1); a group size for the pedestrian who is carrying the DSRC-enabled device; a group radius for the pedestrian who is carrying the DSRC-enabled device; an estimate of whether the pedestrian is pushing a stroller (e.g., based on one or more of their path history, trajectory, acceleration, walking pattern and other data indicated by the digital data included in Part 1 or Part 2 versus known data for people pushing strollers); an estimate of whether the pedestrian has the intent to cross a roadway (e.g., based on the pedestrian's trajectory); an estimate of whether the pedestrian is traveling with an animal (e.g., based on one or more of their path history, trajectory, acceleration, walking pattern and other data indicated by the digital data included in Part 1 or Part 2 versus known data for pedestrians traveling with animals); an estimate of the type of animal traveling with the pedestrian if the pedestrian is estimated to be walking with an animal (e.g., based on one or more of their path history, trajectory, acceleration, walking pattern and other data indicated by the digital data included in Part 1 or Part 2 versus known data for specific animal types or pedestrians traveling with such animals); an estimate of whether the pedestrian is utilizing non-vehicular propulsion (e.g., based on one or more of their path history, trajectory, acceleration, walking pattern and other data indicated by the digital data included in Part 1 or Part 2 versus known data for pedestrians traveling on a bike, scooter, skateboard, or any other type of non-vehicle propulsion.)

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
monitoring, by an onboard vehicle computer, a first channel of a Vehicle-to-Everything (V2X) radio for a V2X message;
determining waveform data describing a first waveform that is measured on the first channel by the onboard vehicle computer when monitoring the first channel;
transmitting, on a reserved channel, a wireless message, wherein the reserved channel is adjacent to the first channel;
determining interference data which describes an adjacent channel interference waveform which is measured on the first channel by the onboard vehicle computer when monitoring the first channel, wherein the first waveform includes the adjacent channel interference waveform and the adjacent channel interference waveform is caused by transmission of the wireless message on the reserved channel; and
canceling out the adjacent channel interference waveform described by the interference data from the first waveform described by the waveform data to generate digital data describing a version of the V2X message that substantially does not include the adjacent channel interference waveform.

2. The method of claim 1, wherein the V2X message is a Dedicated Short-Range Communication (DSRC) message.

3. The method of claim 1, wherein the V2X message is not one of the following: a WiFi message; a 3G message; a 4G message; a 5G message; a Long-Term Evolution (LTE) message; a millimeter wave communication message; a Bluetooth message; and a satellite communication.

4. The method of claim 1, wherein the V2X radio is an element of a connected vehicle.

5. The method of claim 1, wherein the V2X radio is not an element of a connected vehicle.

6. The method of claim 1, wherein determining the interference data is further based on mask data and wherein canceling out the adjacent channel interference waveform from the first waveform further includes canceling out a transmission mask described by the mask data.

7. The method of claim 1, wherein the reserved channel is reserved for Basic Safety Messages (BSMs) and the adjacent channel interference waveform describes a Basic Safety Message (BSM) that is simultaneously heard on the first channel and transmitted on the reserved channel by the V2X radio.

8. The method of claim 1, wherein the reserved channel is reserved for Pedestrian Safety Messages (PSMs) and the adjacent channel interference waveform describes a Pedestrian Safety Message (PSM) that is simultaneously heard on the first channel and transmitted on the reserved channel by the V2X radio.

9. A system comprising:
a processor communicatively coupled to a Vehicle-to-Everything (V2X) radio and a non-transitory memory, wherein the V2X radio is operable to receive a V2X message on a first channel of the V2X radio and the non-transitory memory stores computer code that is operable, when executed by the processor, to cause the processor to:
monitor, by the processor, the first channel for the V2X message;
determine waveform data describing a first waveform that is measured on the first channel by the processor when monitoring the first channel;
transmit, on a reserved channel, a first wireless message, wherein the reserved channel is adjacent to the first channel;
determine interference data which describes an adjacent channel interference waveform which is measured on the first channel by the processor when monitoring the first channel, wherein the first waveform includes the adjacent channel interference waveform and the adjacent channel interference waveform is caused by transmission of the first wireless message on the reserved channel; and
cancel out the adjacent channel interference waveform described by the interference data from the first waveform described by the waveform data to generate digital data describing a version of the V2X message that substantially does not include the adjacent channel interference waveform.

10. The system of claim 9, wherein the V2X message is a Dedicated Short-Range Communication (DSRC) message.

11. The system of claim 9, wherein the V2X message is not one of the following: a WiFi message; a 3G message; a 4G message; a 5G message; a Long-Term Evolution (LTE) message; a millimeter wave communication message; a Bluetooth message; and a satellite communication.

12. The system of claim 9, wherein the V2X radio is an element of a connected vehicle.

13. The system of claim 9, wherein monitoring the first channel includes the processor measuring the first waveform and the adjacent channel interference waveform.

14. The system of claim 9, wherein the V2X radio includes a plurality of channels including the first channel and a reserved channel, wherein the reserved channel is adjacent to the first channel and the adjacent channel interference waveform is caused by a subsequent wireless message that is transmitted on the reserved channel.

15. The system of claim 14, wherein the reserved channel is reserved for Basic Safety Messages (BSMs) and the adjacent channel interference waveform describes a Basic Safety Message (BSM) that is simultaneously heard on the first channel and transmitted on the reserved channel by the V2X radio.

16. The system of claim 14, wherein the reserved channel is reserved for Pedestrian Safety Messages (PSMs) and the adjacent channel interference waveform describes a Pedestrian Safety Message (PSM) that is simultaneously heard on the first channel and transmitted on the reserved channel by the V2X radio.

17. A computer program product comprising a non-transitory memory that stores instructions that, when executed by a processor, causes the processor to perform operations comprising:
monitoring, by the processor, a first channel of a Vehicle-to-Everything (V2X) radio for a V2X message;
determining waveform data describing a first waveform that is measured on the first channel by the processor when monitoring the first channel;
transmitting, on a reserved channel, a wireless message, wherein the reserved channel is adjacent to the first channel;
determining interference data which describes an adjacent channel interference waveform which is measured on the first channel by the processor when monitoring the first channel, wherein the first waveform includes the adjacent channel interference waveform and the adjacent channel interference waveform is caused by transmission of the wireless message on the reserved channel; and
canceling out the adjacent channel interference waveform described by the interference data from the first waveform described by the waveform data to generate digital data describing a version of the V2X message that substantially does not include the adjacent channel interference waveform.

18. The computer program product of claim 17, wherein determining the interference data is further based on mask data and wherein canceling out the adjacent channel interference waveform from the first waveform further includes canceling out a transmission mask described by the mask data.

19. The computer program product of claim 17, wherein the reserved channel is reserved for Basic Safety Messages (BSMs) and the adjacent channel interference waveform describes a Basic Safety Message (BSM) that is simultaneously heard on the first channel and transmitted on the reserved channel by the V2X radio.

20. The computer program product of claim 17, wherein the reserved channel is reserved for Pedestrian Safety Messages (PSMs) and the adjacent channel interference waveform describes a Pedestrian Safety Message (PSM) that is simultaneously heard on the first channel and transmitted on the reserved channel by the V2X radio.

* * * * *